US007854608B2

United States Patent
Nuber et al.

(10) Patent No.: US 7,854,608 B2
(45) Date of Patent: *Dec. 21, 2010

(54) METHOD AND APPARATUS FOR HEAT TREATMENT IN A FLUIDIZED BED

(75) Inventors: Dirk Nuber, Oberursel (DE); Werner Stockhausen, Bad Vilbel (DE); Michael Ströder, Neu-Anspach (DE)

(73) Assignee: Outotec Oyj, Espoo (FI)

( * ) Notice: Subject to any disclaimer, the term of this patent is extended or adjusted under 35 U.S.C. 154(b) by 1097 days.

This patent is subject to a terminal disclaimer.

(21) Appl. No.: 10/540,436

(22) PCT Filed: Dec. 10, 2003

(86) PCT No.: PCT/EP03/13982

§ 371 (c)(1),
(2), (4) Date: Nov. 10, 2005

(87) PCT Pub. No.: WO2004/056465

PCT Pub. Date: Jul. 8, 2004

(65) Prior Publication Data

US 2006/0231466 A1    Oct. 19, 2006

(30) Foreign Application Priority Data

Dec. 23, 2002  (DE)  ................. 102 60 741

(51) Int. Cl.
B01J 8/24    (2006.01)
C22B 1/10    (2006.01)
C22B 5/14    (2006.01)

(52) U.S. Cl. .................... 432/16; 75/444; 148/630; 266/172

(58) Field of Classification Search ......... 423/170–172, 423/554, 555; 432/15, 16; 122/4 D; 106/701, 106/744; 75/754, 444; 148/630; 266/172
See application file for complete search history.

(56) References Cited

U.S. PATENT DOCUMENTS 2,485,317 A  * 10/1949  Roetheli ................. 423/172
2,582,710 A     1/1952  Martin (Continued)

FOREIGN PATENT DOCUMENTS

AU        9894057        5/2000

(Continued)

OTHER PUBLICATIONS

English abstract of German application No. 3822999.

(Continued)

*Primary Examiner*—Gregory A Wilson
(74) *Attorney, Agent, or Firm*—Leydig, Voit & Mayer, Ltd.

(57) ABSTRACT

The present invention relates to a method for the heat treatment of fine-grained solids, in particular gypsum, in which the solids are heated to a temperature of 50 to 1000° C. in a fluidized bed reactor (1), and to a corresponding plant. To improve the energy utilization, it is proposed to introduce a first gas or gas mixture from below through a preferably central gas supply tube (3) into a mixing chamber (21) of the reactor (1), the gas supply tube (3) being at least partly surrounded by a stationary annular fluidized bed (2) which is fluidized by supplying fluidizing gas, and to adjust the gas velocities of the first gas or gas mixture as well as of the fluidizing gas for the annular fluidized bed (2) such that the particle Froude numbers in the gas supply tube (3) are between 1 and 100, in the annular fluidized bed (2) between 0.02 and 2 and in the mixing chamber (21) between 0.3 and 30.

12 Claims, 2 Drawing Sheets

U.S. PATENT DOCUMENTS

| | | | |
|---|---|---|---|
| 2,607,666 A | 8/1952 | Martin | |
| 2,714,126 A | 7/1955 | Keith | |
| 2,826,460 A | 3/1958 | Cameron et al. | |
| 2,864,674 A | 12/1958 | King | |
| 2,874,095 A | 2/1959 | Boisture et al. | 202/25 |
| 2,901,421 A | 8/1959 | Bourguet et al. | |
| 3,528,179 A | 9/1970 | Smith | |
| 3,565,408 A * | 2/1971 | Reh et al. | 423/625 |
| 3,578,798 A | 5/1971 | Lapple et al. | |
| 3,671,424 A | 6/1972 | Saxton | |
| 3,876,392 A | 4/1975 | Kalina et al. | |
| 3,884,620 A * | 5/1975 | Rammler | 432/15 |
| 3,995,987 A * | 12/1976 | MacAskill | 432/15 |
| 4,044,094 A | 8/1977 | Barner et al. | |
| 4,073,642 A | 2/1978 | Collin et al. | |
| 4,080,437 A | 3/1978 | Reh et al. | |
| 4,091,085 A * | 5/1978 | Reh et al. | 432/15 |
| 4,111,675 A | 9/1978 | Ballard | |
| 4,147,911 A | 4/1979 | Nishitani | |
| 4,191,544 A | 3/1980 | Boll et al. | |
| 4,338,283 A | 7/1982 | Sakamoto et al. | |
| 4,377,466 A | 3/1983 | Wallman | |
| 4,402,754 A | 9/1983 | Schmidt et al. | |
| 4,404,755 A | 9/1983 | Stewart et al. | |
| 4,490,287 A | 12/1984 | Hardwick et al. | |
| 4,545,132 A * | 10/1985 | Li et al. | 432/16 |
| 4,555,388 A * | 11/1985 | Hundebol | 432/15 |
| 4,676,824 A | 6/1987 | Daradimos et al. | |
| 4,716,856 A | 1/1988 | Beisswenger et al. | |
| 4,786,477 A | 11/1988 | Yoon et al. | |
| 4,789,580 A * | 12/1988 | Hirsch et al. | 75/500 |
| 4,795,547 A * | 1/1989 | Barnes | 208/113 |
| 4,806,158 A | 2/1989 | Hirsch et al. | |
| 4,817,563 A | 4/1989 | Beisswenger et al. | 122/4 D |
| 4,822,592 A | 4/1989 | Misra | |
| 4,919,715 A | 4/1990 | Smith et al. | |
| 4,992,245 A | 2/1991 | Van Slooten et al. | |
| 5,033,413 A | 7/1991 | Zenz et al. | |
| 5,205,350 A | 4/1993 | Hirsch et al. | |
| 5,269,236 A | 12/1993 | Okuno et al. | |
| 5,349,154 A | 9/1994 | Harker et al. | |
| 5,374,413 A | 12/1994 | Kim et al. | |
| 5,382,412 A | 1/1995 | Kim et al. | |
| 5,382,418 A | 1/1995 | Thone et al. | |
| 5,437,850 A * | 8/1995 | Kroehl et al. | 423/555 |
| 5,505,907 A * | 4/1996 | Hiltunen et al. | 422/146 |
| 5,527,379 A | 6/1996 | Hirsch et al. | |
| 5,560,762 A * | 10/1996 | Bresser et al. | 75/447 |
| 5,573,689 A | 11/1996 | Fukuoka et al. | |
| 5,603,748 A | 2/1997 | Hirsch et al. | |
| 5,783,158 A | 7/1998 | Tacke et al. | |
| 5,942,110 A | 8/1999 | Norris | |
| 5,972,302 A | 10/1999 | Tranquilla et al. | |
| 6,007,869 A | 12/1999 | Schreieder et al. | |
| 6,015,539 A * | 1/2000 | Schmidt et al. | 423/625 |
| 6,022,513 A | 2/2000 | Pecoraro et al. | |
| 6,074,533 A | 6/2000 | Tranquilla et al. | |
| 6,110,413 A | 8/2000 | Jung et al. | |
| 6,197,234 B1 | 3/2001 | Goudmand et al. | |
| 6,368,389 B1 | 4/2002 | Birke et al. | |
| 6,395,248 B1 | 5/2002 | Kim et al. | |
| 6,413,477 B1 | 7/2002 | Govoni et al. | |
| 6,416,721 B1 | 7/2002 | Sanjurjo et al. | |
| 6,827,786 B2 | 12/2004 | Lord | |
| 6,830,597 B1 | 12/2004 | Green | |
| 7,526,923 B2 | 5/2009 | Lothe | |
| 2002/0113024 A1 | 8/2002 | Pilz et al. | |
| 2006/0162500 A1* | 7/2006 | Nuber et al. | 75/613 |
| 2006/0228281 A1 | 10/2006 | Stroeder et al. | |
| 2006/0230879 A1* | 10/2006 | Stroder et al. | 75/444 |
| 2006/0230880 A1 | 10/2006 | Hirsch et al. | |
| 2006/0231433 A1 | 10/2006 | Rufo et al. | |
| 2006/0231466 A1 | 10/2006 | Nuber | |
| 2006/0237300 A1 | 10/2006 | Stroder et al. | |
| 2006/0249100 A1* | 11/2006 | Freytag et al. | 122/400 |
| 2006/0263292 A1* | 11/2006 | Hirsch et al. | 423/625 |
| 2006/0266636 A1 | 11/2006 | Stroder et al. | |
| 2006/0278566 A1* | 12/2006 | Orth et al. | 422/139 |
| 2007/0137435 A1* | 6/2007 | Orth et al. | 75/451 |
| 2008/0124253 A1 | 5/2008 | Schmidt et al. | |

FOREIGN PATENT DOCUMENTS

| | | |
|---|---|---|
| CA | 2060878 | 8/1992 |
| CN | 1424280 | 6/2003 |
| CN | 1732276 | 2/2006 |
| CN | 1738918 | 2/2006 |
| DE | 1016938 | 10/1957 |
| DE | 2524541 | 12/1976 |
| DE | 2636134 | 2/1977 |
| DE | 2624302 | 12/1977 |
| DE | 2805906 | 8/1979 |
| DE | 3235559 | 5/1984 |
| DE | 248109 | 7/1987 |
| DE | 3822999 | 1/1990 |
| DE | 278348 | 5/1990 |
| DE | 40 15031 | 11/1991 |
| DE | 4103965 | 4/1992 |
| DE | 4206602 | 6/1993 |
| DE | 4410093 | 3/1995 |
| DE | 4446531 A1 | 6/1996 |
| DE | 196 09284 | 11/1997 |
| DE | 19841513 | 5/1999 |
| DE | 198 13 286 A1 | 9/1999 |
| DE | 694 16458 | 9/1999 |
| DE | 694 17103 | 9/1999 |
| DE | 10101157 | 7/2002 |
| DE | 10061386 | 9/2002 |
| DE | 10164086 | 8/2003 |
| DE | 10260743 | 7/2004 |
| EP | 0222452 A1 | 5/1987 |
| EP | 246191 | 11/1987 |
| EP | 0403820 A1 | 12/1990 |
| EP | 534243 | 3/1993 |
| EP | 0 575 245 | 12/1993 |
| EP | 0630 683 | 12/1994 |
| EP | 630975 | 12/1994 |
| EP | 748391 | 12/1996 |
| EP | 0861208 A1 | 9/1998 |
| EP | 995065 | 4/2000 |
| GB | 827627 | 2/1960 |
| GB | 915412 | 1/1963 |
| GB | 951245 | 3/1964 |
| GB | 1316849 | 5/1973 |
| GB | 1502576 | 3/1978 |
| WO | WO-8909290 | 10/1989 |
| WO | WO-9011824 | 10/1990 |
| WO | WO-9808989 | 3/1998 |
| WO | WO-0144719 | 6/2001 |
| WO | WO-02055744 | 7/2002 |
| WO | WO-2004056465 | 7/2004 |
| WO | WO-2004056467 | 7/2004 |

OTHER PUBLICATIONS

English abstract of German application No. 40 15031.
English abstract of German application No. 69417103.
English abstract of EPO application No. 0575245.
English abstract of German application No. 694 16458.
English abstract of German application No. 196 16458.
Abstract, fluidized bed combustion, Ullman (5). B3, 14-4, downloaded from <http://www.roemp.com>, Jul. 23, 2003.
"Ullmann's Encyclopedia of Industrial Chemistry" 5th edition, 1994, vol. A25, pp. 574-575.

Sander U H F et al. "Production from elemental sulphur" Sulphur, Sulphur Dioxide and Sulphuric Acid. Introduction to their Industrial Chemistry and Technology, London, British Sulphur Corporation, GB, 1984, pp. 168-176, XP0006085.

Barbara Elvers et al. "Ullmann's Encyclopedia of Industrial Chemistry", Fifth, Completely Revised Edition, vol. A25, VCH, pp. 567-577.

Notice of Allowance dated Feb. 6, 2009 for U.S. Appl. No.10/540,355 filed Feb. 2, 2006.

Vijay, "Preoxidation and Hydrogen Reduction of Ilmenite in a Fluidized Bed Reactor" XP 000632260, Metallurgical and Material Transactions B, vol. 27B, Oct. 1996, 9. 731-738.

Kim, Y.T. et al, "Entrainment of solids in an internally circulating fluidized bed with draft tube". Chemical Engineering Journal, vol. 66, (1997), p. 105-110.

Notice of Allowance dated Jul. 20, 2009 for U.S. Appl. No. 10/540,435 filed Mar. 27, 2006.

Office Action dated Sep. 19, 2008 for U.S. Appl. No. 10/540,435 filed Mar. 27, 2006.

Office Action dated Feb. 11, 2009 for U.S. Appl. No. 10/540,497 filed May 31, 2006.

Notice of Allowance dated Feb. 6, 2009 for U.S. Appl. No. 10/540,355 filed Feb. 2, 2006.

Office Action dated Aug. 12, 2008 for U.S. Appl. No. 10/540,355 filed Feb. 2, 2006.

Office Action dated Mar. 27, 2008 for U.S. Appl. No. 10/540,355 filed Feb. 2, 2006.

Office Action dated Jul. 8, 2009 for U.S. Appl. No. 10/540,073 filed Jul. 19, 2006.

Office Action dated Jan. 26, 2009 for U.S. Appl. No. 10/540,073 filed Jul. 19, 2006.

Office Action dated Aug. 21, 2008 for U.S. Appl. No. 10/540,073 filed Jul. 19, 2006.

Office Action dated May 13, 2009 for U.S. Appl. No. 10/540,376 filed Jan. 17, 2006.

Office Action dated Oct. 9, 2008 for U.S. Appl. No. 10/540,376 filed Jan. 17, 2006.

Office Action dated Jun. 2, 2008 for U.S. Appl. No. 10/540,376 filed Jan. 17, 2006.

Office Action dated Sep. 17, 2008 for U.S. Appl. No. 10/540,434 filed May 16, 2006.

Notice of Allowance dated Dec. 3, 2008 for U.S. Appl. No. 10/540,437 filed May 10, 2006.

Office Action dated Jun. 16, 2008 for U.S. Appl. No. 10/540,437 filed May 10, 2006.

Office Action dated Apr. 17, 2009 for U.S. Appl. No. 10/540,438 filed Jun. 6, 2006.

Notice of Allowability for U.S. Appl. No. 10/540,438 filed Jun. 6, 2006.

Office Action dated Jul. 10, 2007 for U.S. Appl. No. 10/540,438 filed Jun. 6, 2006.

Office Action dated Dec. 29, 2008 for U.S. Appl. No. 10/540,071 filed May 11, 2006.

Office Action dated Jul. 23, 2008 for U.S. Appl. No. 10/540,071 filed May 11, 2006.

Notice of Allowance dated Apr. 13, 2009 for U.S. Appl. No. 10/540,071 filed May 11, 2006.

\* cited by examiner

METHOD AND APPARATUS FOR HEAT TREATMENT IN A FLUIDIZED BED

This application is the national phase application under 35 U.S.C. §371 of International Application No. PCT/EP2003/013982 filed on Dec. 10, 2003, entitled, "Method And Apparatus For Heat Treatment In A Fluidized Bed" which claims the benefit of German Patent Application No. 102 60 741.9 filed on Dec. 23, 2002.

TECHNICAL FIELD

The present invention relates to a method for the heat treatment of fine-grained solids, in particular gypsum, in which the solids are heated to a temperature of 50 to 1000° C. in a fluidized bed reactor, and to a corresponding plant.

Such methods and plants are used for instance in the calcining of gypsum to form water-free anhydrite. Previously, venturi fluidized beds or fluidized beds with a ceramic perforated bottom were used for this as air distributors. However, this only allowed a small regulating range. In part-load operation or when shutting down the plant, there is also the risk that, in spite of the sophisticated mechanical feature of the perforated bottom, the fine-grained solids fall through the grating.

Reactors with either a stationary fluidized bed or a circulating fluidized bed are generally known for the heat treatment of solids. However, the energy utilization of the calcining step achieved when using a stationary fluidized bed is in need of improvement. A particular reason for this is that the mass and heat transfer is rather moderate on account of the comparatively low degree of fluidization. Furthermore, preheating of the solids can hardly be integrated in a suspension heat exchanger, because dust-laden gases are rather not admitted to the fluidizing nozzles of the stationary fluidized bed. Due to the high degree of fluidization, circulating fluidized beds on the other hand have better conditions for a mass and heat transfer and allow the integration of a suspension heat exchanger, but are restricted in terms of their solids retention time due to the high degree of fluidization.

DESCRIPTION OF THE INVENTION

Therefore, it is the object of the present invention to improve the heat and mass transfer conditions in the heat treatment of fine-grained solids.

In accordance with the invention, this object is achieved by a method as initially mentioned in which a first gas or gas mixture is introduced from below through a preferably centrally arranged gas supply tube (central tube) into a mixing chamber of the reactor, the central tube being at least partly surrounded by a stationary annular fluidized bed which is fluidized by supplying fluidizing gas, and in which the gas velocities of the first gas or gas mixture as well as of the fluidizing gas for the annular fluidized bed are adjusted such that the particle Froude numbers in the central tube are between 1 and 100, in the annular fluidized bed between 0.02 and 2 and in the mixing chamber between 0.3 and 30.

In the method of the invention, the advantages of a stationary fluidized bed, such as a sufficiently long solids retention time, and the advantages of a circular fluidized bed, such as a good mass and heat transfer, can surprisingly be combined with each other during the heat treatment, while the disadvantages of both systems are avoided. When passing through the upper region of the central tube, the first gas or gas mixture entrains solids from the annular stationary fluidized bed, which is referred to as the annular fluidized bed, into the mixing chamber, so that, due to the high slip velocities between the solids and the first gas, an intensively mixed suspension is formed and an optimum heat and mass transfer between the two phases is achieved. By correspondingly adjusting the bed height in the annular fluidized bed as well as the gas velocities of the first gas or gas mixture and of the fluidizing gas, the solids load of the suspension above the orifice region of the central tube can be varied within wide ranges, so that the pressure loss of the first gas between the orifice region of the central tube and the upper outlet of the mixing chamber can be between 1 mbar and 100 mbar. In the case of high solids loading of the suspension in the mixing chamber, a large part of the solids will separate out from the suspension and fall back into the annular fluidized bed. This recirculation is called internal solids recirculation, the stream of solids circulating in this internal circulation normally being significantly larger than the amount of solids supplied to the reactor from outside. The (smaller) amount of not precipitated solids is discharged from the mixing chamber together with the first gas or gas mixture. The retention time of the solids in the reactor can be varied within a wide range by the selection of the height and cross-sectional area of the annular fluidized bed and be adapted to the desired heat treatment. Due to the high solids loading on the one hand and the good suspension of the solids in the gas stream on the other hand, excellent conditions for good mass and heat transfer are obtained above the orifice region of the central tube. The amount of solids entrained from the reactor with the gas stream is completely or at least partly recirculated to the reactor, with the recirculation expediently being fed into the stationary fluidized bed. The stream of solids thus recirculated to the annular fluidized bed normally lies in the same order of magnitude as the stream of solids supplied to the reactor from outside. Apart from the excellent utilization of energy, another advantage of the method in accordance with the invention consists in the possibility of quickly, easily and reliably adjusting the transfer of energy of the method and the mass transfer to the requirements by changing the flow velocities of the first gas or gas mixture and of the fluidizing gas.

To ensure a particularly effective heat transfer in the mixing chamber and a sufficient retention time in the reactor, the gas velocities of the first gas mixture and of the fluidizing gas are preferably adjusted for the fluidized bed such that the dimensionless particle Froude numbers ($Fr_P$) are 1.15 to 20 in the central tube, 0.115 to 1.15 in the annular fluidized bed and/or 0.37 to 3.7 in the mixing chamber. The particle Froude numbers are each defined by the following equation:

$$Fr_p = \frac{u}{\sqrt{\frac{(\rho_s - \rho_f)}{\rho_f} * d_p * g}}$$

with
u=effective velocity of the gas flow in m/s
ρs=density of a solid particle in kg/m3
ρf=effective density of the fluidizing gas in kg/m3
dp=mean diameter in m of the particles of the reactor inventory (or the particles forming) during operation of the reactor
g=gravitational constant in m/s².

When using this equation it should be considered that $d_p$ does not indicate the mean diameter ($d_{50}$) of the material used, but the mean diameter of the reactor inventory formed during the operation of the reactor, which can differ significantly in both directions from the mean diameter of the material used (primary particles). It is also possible for particles (secondary particles) with a mean diameter of 20 to 30 μm to be formed for instance during the heat treatment from very fine-grained material with a mean diameter of, for example, 3 to 10 μm. On the other hand, some materials, for example ores, are decrepitated during the heat treatment.

In a development of the idea of the invention, it is proposed to adjust the bed height of solids in the reactor such that the annular fluidized bed at least partly extends for example beyond the upper orifice end of the central tube by a few centimeters, and thus solids are constantly introduced into the first gas or gas mixture and entrained by the gas stream to the mixing chamber located above the orifice region of the central tube. In this way, there is achieved a particularly high solids loading of the suspension above the orifice region of the central tube.

With the method in accordance with the invention, in particular moist gypsum, such as for example REA gypsum, can be subjected to effective heat treatment, in order in particular to obtain anhydrous forms of gypsum. The method is particularly suited for producing anhydrite by calcining. The moist gypsum used has in this case a fine granulation, the grain size of at least the majority of the solids generally being less than 2 mm. A particularly effective heat treatment can be achieved in the case of a grain size of less than 0.2 mm. Further application possibilities for the method lie in the pre-heating and/or calcining of ores and mineral raw materials in an oxidizing atmosphere at temperatures up to a maximum of approximately 1000° C., if internal combustion is ruled out, and in the calcining of clay minerals at about 800° C. At temperatures up to about 750° C., the method in accordance with the invention can also be used for producing transitional hydrates or oxides from aluminium hydroxide.

The generation of the amount of heat necessary for the operation of the reactor can be effected in any way known to the expert for this purpose, for example including by internal combustion in the reactor. To be able to use the method in accordance with the invention also for pre-heating and calcining at temperatures of for example approximately 750° C., at which an internal combustion of fuel in the reactor itself is not possible, the invention proposes the use of an external combustion chamber for generating the necessary process heat and a heat transfer to the material (for example gypsum) to be treated in the reactor with the annular fluidized bed. For this purpose, the reactor is supplied via the central tube with hot gas, which is generated in the upstream combustion chamber by burning supplied gaseous, liquid and/or solid fuel, possibly with the admixture of gas containing oxygen. Depending on the necessary oxygen content, air or some other oxygen-containing gas, for example with an oxygen content of 15 to 30%, may be admixed. Of course it is also possible to generate only part of the energy demand by burning fresh fuel and to cover the remaining part by supplying hot, fuel-free exhaust gases from a downstream stage of the process, for example cooling, or other parallel processes. If the temperatures of the exhaust gases from downstream or parallel stages of the process are adequately high, just these exhaust gases can also be used for heating the reactor. This is possible in particular whenever only low reactor temperatures are required, for example for drying. In this case, it is also possible to dispense entirely with internal combustion or an upstream combustion chamber.

Depending on the process taking place in the reactor, the process temperature may lie between 50 and 1000° C. In the lower temperature range from 50° C., in particular from approximately 80° C., the annular fluidized bed reactor may also be used only for drying material. In this case, the temperatures must not exceed an upper limit value, from which the heat-treated material undergoes a chemical reaction. In a common form of the method, a temperature range between 150 and 1000° C. is used, for example in the case of calcining.

Air is preferably supplied to the reactor as the gas for fluidizing the annular fluidized bed, it of course also being possible for all other gases or gas mixtures known for this purpose to an expert to be used for this purpose. It may also be advantageous to compress dedusted and/or cooled exhaust gas from downstream stages of the process or other parallel processes such that it can be used as fluidizing gas for the annular fluidized bed.

It has turned out to be advantageous to operate the reactor at a pressure of 0.8 to 10 bar and particularly preferably at atmospheric pressure.

The reactor may be provided upstream with one or more pre-heating stages, in which the solids, for example the moist gypsum, are suspended, dried, pre-heated and/or partly calcined in a pre-heating stage before the heat treatment in the reactor, at least part of the moisture content of the solids being removed. The reactor is preferably provided upstream with two pre-heating stages, respectively comprising a heat exchanger and a downstream separator, the material in the first heat exchanger being heated up by exhaust gas from the second heat exchanger and the material in the second heat exchanger being heated up by exhaust gas from the reactor. Both heat exchangers are preferably suspension heat exchangers. In this way, the overall energy demand of the process is further reduced.

In accordance with the method according to the invention, after the heat treatment in the reactor, the product from the annular fluidized bed of the reactor and/or a separator provided downstream of the reactor is at least partly supplied to a cooling system, which comprises in particular an arrangement of a number of cooling stages connected one after the other. In the separator, in particular a cyclone provided downstream of the reactor, the solids (product) discharged with the gas stream passing through the central tube are separated. They are then either supplied directly to a cooling stage for further treatment or returned via a solids return conduit into the annular fluidized bed of the reactor, it also being possible for part of the solids separated in the separator to reach the cooling system and the remaining part to return to the annular fluidized bed. A major advantage of this flexible solids recirculation is that the solids loading of the suspension in the region of the mixing chamber of the reactor can be deliberately adjusted to the requirements of the process and even changed as and when required during operation.

For adjusting the recirculation of the solids, in a development of the idea of the invention it has proven to be advantageous to measure the pressure loss between the central tube and the discharge conduit of the reactor, leading to the separator, and to regulate it by varying the amount of solids recirculated. A fluidized intermediate container with a downstream dosing device, for instance a variable-speed rotary-vane feeder or a roller-type rotary valve, has turned out to be particularly advantageous for this, it being possible for the solids not needed for recirculation to be discharged for example by means of an overflow and passed to the cooling system. The solids recirculation contributes in a simple way to keeping the process conditions constant in the reactor and/or adjusting the mean retention time of the solids in the reactor.

Gentle cooling of the product with a high heat transfer can be achieved in the cooling system if the product to be cooled forms at least in one cooling stage, preferably the last cooling stage of the cooling system, at least one, in particular stationary, fluidized bed, in which it is cooled by a fluidizing gas such as air. Especially in a stationary fluidized bed, a long retention time, and consequently effective cooling, of the product can be achieved by the, for example pre-cooled, fluidizing gas in a comparatively simple manner. Moreover, the mechanical loading of the product is comparatively low in a stationary fluidized bed. If, however, particularly rapid cooling is to take place, a cooling stage with a stationary fluidized bed and a mixing chamber, for instance corresponding to the reactor described above, may also be used. Consequently, the principle according to the invention of combining a stationary and a circular annular fluidized bed in accordance with the present invention can be used both for heating and cooling fine-grained solids. Cooling occurs when the solids are warmer than the gas stream passing through the central tube, at the beginning of the process. Additional cooling can be achieved by a cooling coil with cooling medium, for example water, formed in particular within the stationary annular fluidized bed.

For improved energy utilization, it is provided that the gas which is used for cooling in a cooling stage, and is thereby heated, is supplied to an upstream cooling stage, the reactor, the combustion chamber and/or a pre-heating stage. It is conceivable to pass the gas through a number of, or all of the preceding cooling stages in a cascading manner, beginning with the last cooling stage, in which the product to be cooled has already been pre-cooled by preceding cooling stages. Since the product in the preceding cooling stages is still warmer in each case, it is further cooled in each of the cooling stages and the gas used for the cooling is further heated. Finally, the heated gas can then be supplied to the combustion chamber, the reactor and/or a pre-heating stage.

A plant in accordance with the invention, which is in particular suited for performing the method described above, has a reactor constituting a fluidized bed reactor for the heat treatment of fine-grained solids, in particular gypsum, the reactor having a gas supply system which is formed such that gas flowing through the gas supply system entrains solids from a stationary annular fluidized bed, which at least partly surrounds the gas supply system, into the mixing chamber. Preferably, this gas supply system extends into the mixing chamber. It is, however, also possible to let the gas supply system end below the surface of the annular fluidized bed. The gas is then introduced into the annular fluidized bed for example via lateral apertures, entraining solids from the annular fluidized bed into the mixing chamber due to its flow velocity.

In accordance with the invention, the gas supply system preferably has a central tube extending upwards substantially vertically from the lower region of the reactor, preferably into the mixing chamber of the reactor, which tube is surrounded by a chamber which extends at least partly around the central tube and in which the stationary annular fluidized bed is formed. The central tube may be formed at its outlet opening as a nozzle and/or have one or more distributed apertures in its shell surface, so that during the operation of the reactor solids constantly get into the central tube through the apertures and are entrained by the first gas or gas mixture through the central tube into the mixing chamber. Of course, two or more central tubes with different or identical dimensions and shapes may also be provided in the reactor. Preferably, however, at least one of the central tubes is arranged approximately centrally with reference to the cross-sectional area of the reactor.

In accordance with a preferred embodiment, a separator, in particular a cyclone, is provided downstream of the reactor, for the separation of solids, the separator having a solids conduit leading to the annular fluidized bed of the reactor and/or a solids conduit leading to the cooling system. In order also to be able to remove the finished product directly from the reactor, a solids conduit leading from the annular fluidized bed to the cooling system is further provided in accordance with the invention.

To provide for a reliable fluidization of the solids and the formation of a stationary fluidized bed, provided in the annular chamber of the reactor is a gas distributor which divides the chamber into an upper annular fluidized bed and a lower gas distributor chamber, the gas distributor chamber being connected to a supply conduit for fluidizing gas. Instead of the gas distributor chamber, a gas distributor composed of tubes and/or nozzles may also be provided.

For adjusting the necessary process temperatures in the reactor, provided upstream of the latter is a combustion chamber with supply conduits for fuel, oxygen and/or heated gas, the exhaust gas of which is passed into the central tube for heating the reactor.

Arranged behind the reactor is a cooling system, comprising direct and/or indirect cooling stages, in particular cooling cyclones and/or fluidized bed coolers. In the case of the direct cooling stages, the cooling medium comes directly into contact with the product to be cooled. In this case, other desired reactions, for example product refinements, can also be carried out during the cooling process. Moreover, the cooling action is particularly good in the case of direct cooling stages. In the case of indirect cooling stages, the cooling takes place by means of a cooling medium flowing through a cooling coil. In order to be able also to utilize the gas heated during the cooling in the process itself, a cooling stage has at least one supply conduit leading into a pre-heating stage, into the mixing chamber, into the gas distributor chamber and/or into the combustion chamber.

In the annular fluidized bed and/or the mixing chamber of the reactor, means for deflecting the solids and/or fluid flows may be provided in accordance with the invention. It is for instance possible to position an annular weir, whose diameter lies between that of the central tube and that of the reactor wall, in the annular fluidized bed such that the upper edge of the weir protrudes beyond the solids level obtained during operation, whereas the lower edge of the weir is arranged at a distance from the gas distributor or the like. Thus, solids raining out of the mixing chamber in the vicinity of the reactor wall must first pass by the weir at the lower edge thereof, before they can be entrained by the gas flow of the central tube back into the mixing chamber. In this way, an exchange of solids is enforced in the annular fluidized bed, so that a more uniform retention time of the solids in the annular fluidized bed is obtained.

Developments, advantages and application possibilities of the invention also emerge from the following description of exemplary embodiments and the drawings. All features described and/or illustrated in the drawing form the subject-matter of the invention per se or in any combination, independently of their inclusion in the claims or their back-reference.

DETAILED DESCRIPTION OF THE PREFERRED EMBODIMENTS

Figure 1:
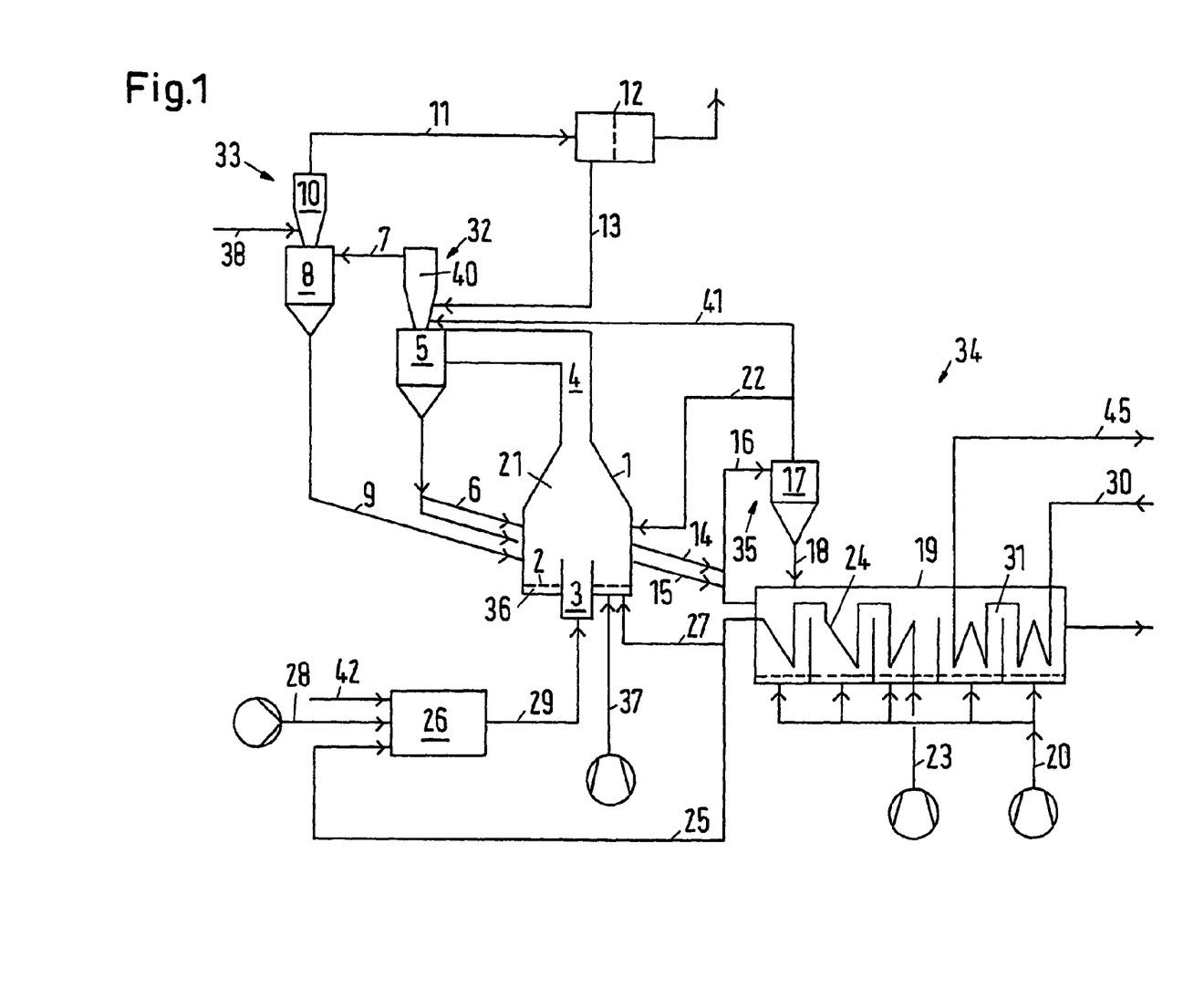
FIG. 1 shows a process diagram of a method and a plant in accordance with a first exemplary embodiment of the present invention.

The plant and the method for the heat treatment of solids, such as for example gypsum, are firstly described generally on the basis of FIG. 1 to explain the functional principle according to the invention.

For the heat treatment, in particular calcining, of solids, the plant has a reactor 1, which is cylindrical for example, with a central tube 3, which is arranged approximately coaxially with the longitudinal axis of the reactor and extends substantially vertically upwards from the bottom of the reactor 1. Provided in the region of the bottom of the reactor 1 is an annular gas distributor 36, into which supply conduits 27 and 37 open out. Arranged in the vertically upper region of the reactor 1, which forms a mixing chamber 21, is a discharge conduit 4, which opens out into a separator 5 formed as a cyclone.

If solids are then introduced into the reactor 1 via the solids conduit 9, a layer annularly surrounding the central tube 3, which is referred to as an annular fluidized bed 2, forms on the gas distributor 36. Both the reactor 1 and the central tube 3 may of course also have a cross section other than the preferred round cross section, as long as the annular fluidized bed 2 at least partly surrounds the central tube 3. Fluidizing gas introduced through the supply conduit 27, 37 flows through the gas distributor 36 and fluidizes the annular fluidized bed 2, so that a stationary fluidized bed is formed. The gas distributor 36 is preferably formed for this purpose as a nozzle grating with a relatively large number of individual nozzles, which are connected to the supply conduits 27, 37. In a more simple embodiment, the gas distributor 36 may also be formed as a grating with a gas distributor chamber located under it. The velocity of the gases supplied to the reactor 1 is then adjusted such that the particle Froude number in the annular fluidized bed 2 is approximately 0.3.

By supplying further solids into the annular fluidized bed 2, the level of the solids in the reactor 1 increases to the extent that solids reach the orifice of the central tube 3. At the same time, a hot gas or gas mixture, which is generated in an upstream combustion chamber 26 by burning gaseous, liquid or solid fuels, is introduced into the reactor 1 through the central tube 3. The velocity of the hot gas supplied to the reactor 1 through the central tube 3 is preferably adjusted such that the particle Froude number in the central tube 3 is approximately 10 and in the mixing chamber 21 is approximately 3.0.

Due to banking of the level of the solids of the annular fluidized bed 2 as compared to the upper edge of the central tube 3, solids flow over this edge into the central tube 3. The upper edge of the central tube 3 may be straight or differently shaped, for example indented, or have lateral apertures. Due to the high gas velocities, the gas flowing through the central tube 3 entrains solids from the stationary annular fluidized bed 2 into the mixing chamber 21 when passing through the upper orifice region, whereby an intensively mixed suspension is formed. The intensive mass and heat transfer between the gas stream and the solids in the mixing chamber 21 has the effect that the previously colder solids are heated particularly well by the warmer gas stream and the gas stream is thereby cooled. If the solids are warmer than the gas stream, a cooling of the solids takes place in a way corresponding to the principle according to the invention.

As a result of the reduction of the flow velocity by the expansion of the gas jet in the mixing chamber 21 and/or by impingement on one of the reactor walls, the entrained solids quickly lose speed and partly fall back again into the annular fluidized bed 2. Between the reactor regions of the stationary annular fluidized bed 2 and the mixing chamber 21 there is thereby obtained a solids circulation. Due to this solids circulation, the solids to be treated circulate for a particularly long time in the reactor 1, it being possible at the same time to utilize the very good heat transfer in the mixing chamber 21.

The solids not precipitated from the gas stream above the central tube 3 in the mixing chamber 21 and returned directly into the annular fluidized bed 2 are discharged with the hot gas stream from the reactor 1 upwards through a discharge conduit 4, separated from the gas stream in a separator 5 formed as a cyclone and at least partly returned into the annular fluidized bed 2 through the solids return conduit 6.

The solids to be treated are thus in total returned into the annular fluidized bed 2 in two ways: after separation from the gas stream in the mixing chamber 21 and after separation in the separator 5 through the solids return conduit 6.

The heat content of the gas stream leaving the separator 5 is utilized in a multistage, in the present case two-stage, system of pre-heating stages 32, 33, which are composed of heat exchangers 40, 10 with downstream separators 12, 8. In this case, the solids to be treated are supplied as raw material to the last heat exchanger 10 on the exhaust gas side, formed as a venturi dryer. There, the supplied solids are suspended in the exhaust gas of the separator 8 of the upstream (second-last) pre-heating stage 32, dried, pre-heated and passed through a solids conduit 11 to the separator 12. The solids separated there are supplied through a solids conduit 13 to the heat exchanger 40 of the second-last pre-heating stage 32, while the exhaust gas escapes. The solids are then suspended by the exhaust gas leaving the separator 5, further pre-heated and supplied through the solids conduit 7 to the separator 8. The pre-heated solids separated there are supplied through the solids conduit 9 to the annular fluidized bed 2 of the reactor 1, with the exhaust gas of the separator 8 in turn being passed to the last pre-heating stage 33.

After the heat treatment in the reactor 1, the amount of product, corresponding to the amount of solids to be treated and introduced into the venturi dryer 10, is supplied to a cooling system 34 either directly from the annular fluidized bed 2 through the product supply conduit 14 or from the solids return conduit 6 through the product supply conduit 15. This cooling system 34 comprises an arrangement of direct and/or indirect cooling stages 35, 19 with heat exchangers, for example cooling cyclones or fluidized bed coolers, by which air required in the process is pre-heated and product heat no longer usable in the process is removed. The selection of the type and number of the individual cooling stages 35, 19 or their cooling units depends substantially on the ratio of the amount of air required in the process to the amount of product to be cooled.

In the first cooling stage 35, the product to be cooled is supplied to a rising conduit 16 through the product supply conduits 14, 15. In this rising conduit 16 and the following cooling cyclone 17, the product is cooled, then separated and supplied to a multi-stage fluidized bed cooler 19 through a solids conduit 18. The air required as fluidizing gas for the fluidized bed cooler 19 is supplied to the individual stages of the fluidized bed cooler 19 through an air conduit 20 connected to a blower, is heated there during the cooling of the product and is passed through the rising conduit 16 to the cooling cyclone 17. In the rising conduit 16, this fluidizing air is further heated, with the product being cooled. Here, the heated air of the second cooling stage 19 is thus passed to the first cooling stage 35. After the dedusting in the cyclone 17, the heated air (fluidizing air) is either directed through supply conduit 22 into the reactor 1 or through supply conduit 41 into the heat exchanger 40 formed as a venturi pre-heater.

In the multi-stage fluidized bed cooler 19, the product is firstly cooled in one or more stages in counter-current to the combustion air, both indirect cooling taking place through the air conduit 23 and a cooling coil 24, formed as a heat exchanger element, and direct cooling taking place through the air conduit 20 and the fluidizing air fed into the individual stages as a result. The air heated during the indirect cooling is supplied through the supply conduit 25 to the combustion chamber 26 and optionally also through the supply conduit 27 to the annular fluidized bed as fluidizing gas. In the combustion chamber 26, fuel supplied via the fuel conduit 42 is burned with the heated air from the cooling stages and possibly additional air supplied via the air supply 28. The exhaust gas of the combustion chamber is passed through the gas stream conduit 29 to the central tube 3 and as the first gas or gas mixture into the mixing chamber 21.

The product is cooled indirectly in the fluidized bed cooler 19 in one or more stages in counter-current to a cooling medium, for example water, flowing through a cooling coil 31, and directly by the fluidizing air in the individual stages, until the desired end temperature is reached. The cooling medium is passed to the cooling coil 31 via conduit 30 and subsequently removed again via conduit 45.

A particular advantage of this method is that the advantages of a stationary fluidized bed (annular fluidized bed) and a circulating fluidized bed in a mixing chamber can be optimally utilized and at the same time the waste heat produced by the cooling of the product is supplied again to the reactor to save energy.

Example

Calcining of Gypsum

Figure 2:
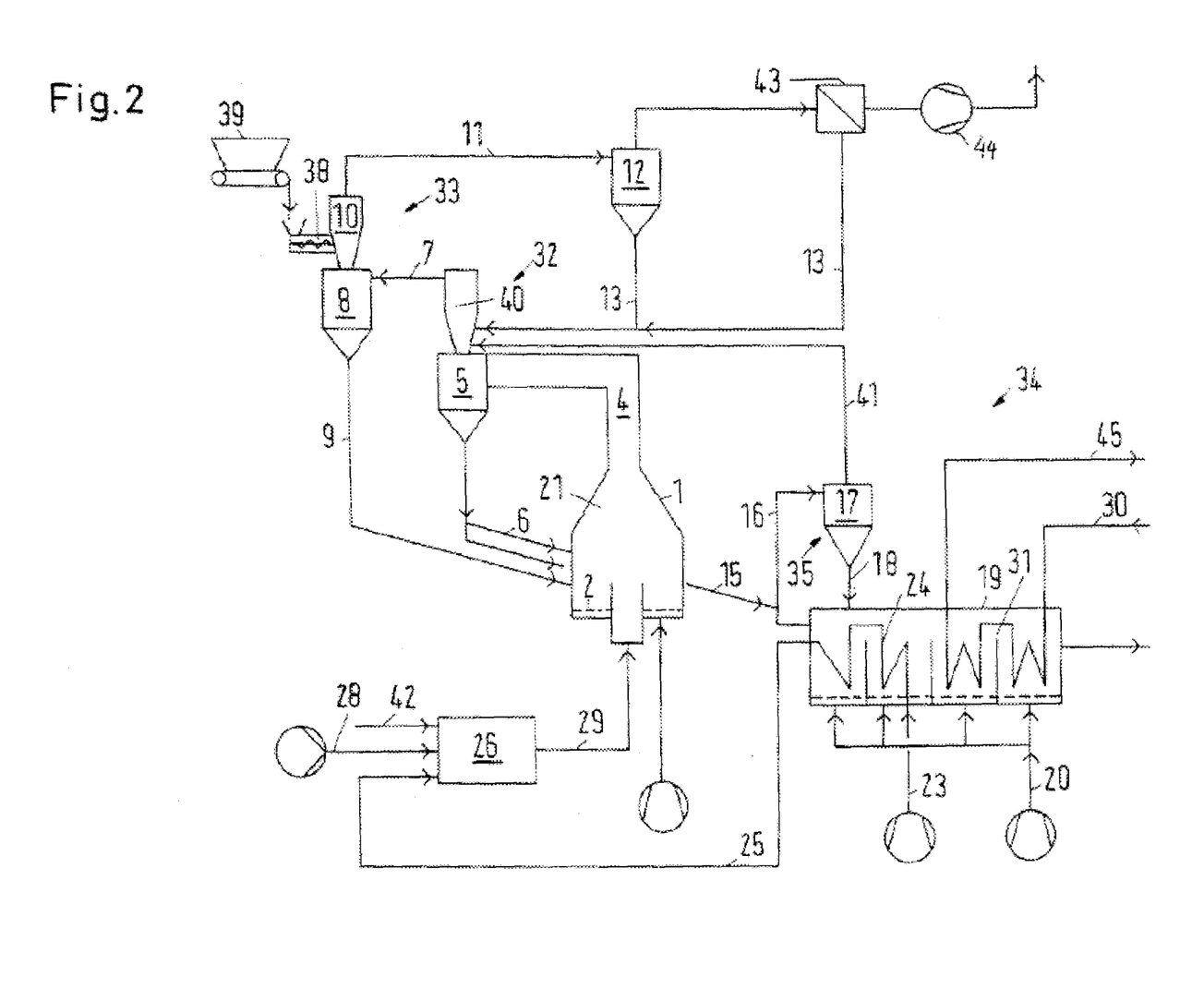
FIG. 2 shows a process diagram of a method and a plant in accordance with a second exemplary embodiment of the present invention.

The calcining of REA gypsum to form water-free anhydrite is described in detail below on the basis of FIG. 2, which shows a plant similar to FIG. 1. Moist gypsum is introduced into the venturi dryer 10 by means of the screw conveyor 38 with a volumetric flow of for example 42 t/h from a storage bunker 39 and suspended by exhaust gas from the cyclone 8, dried and supplied to a separator 12, formed as a cyclone, via the solids conduit 11. The exhaust gas from the cyclone 12 is passed to a bag filter 43, where it is freed completely of solids and blown out by an exhaust gas blower 44 via a stack.

The dried gypsum separated in the cyclone 12 and the bag filter 43 is passed via solids conduits 13 to a second venturi dryer 40, heated further, separated from the exhaust gas in the cyclone 8 and introduced into the fluidized bed 2 of the reactor 1 through the solids conduit 9. In the combustion chamber 26, about 36,000 $Nm^3/h$ of hot gas with a temperature of about 1,130° C. are generated and passed to the reactor 1 through the gas-stream conduit 29. The hot gas cools in the reactor 1 to about 750° C. At the same time, the gypsum introduced into the reactor, which has a grain size of less than 0.2 mm, is heated to about 750° C. and calcined to form anhydrite. The solids are transported with the exhaust gases of the reactor 1 into the return cyclone 5 (separator), separated there and largely returned through the solids return conduit 6 into the annular fluidized bed 2 of the reactor 1.

The part-stream of the amount of anhydrite product, which corresponds to the amount of gypsum introduced into the reactor 1, is supplied through the product supply conduit 15 to the rising conduit 16 belonging to the cooling cyclone 17 of the first cooling stage 35. The anhydrite is cooled in the cooling cyclone 17 to about 600° C. and passed through the solids conduit 18 to a first chamber of the fluidized bed cooler 19. The exhaust air of the cooling cyclone 17 is passed through the supply conduit 41 to the venturi dryer 40.

In the fluidized bed cooler 19, the anhydrite is cooled in stages to about 80° C. The amount of product is about 30 t/h. During the cooling of the anhydrite, the burner air (about 14,000 $Nm^3/h$) supplied through the air conduit 23 is indirectly heated to about 450° C. in banks of heat exchangers which are formed as cooling coils 24 and are installed in the first two chambers of the fluidized bed cooler 19. This air is supplied to the combustion chamber 26 through the supply conduit 25. As fuel, about 1,300 $Nm^3/h$ of natural gas are supplied to the combustion chamber 26 through the fuel conduit 42. In addition, further combustion air (about 21,000 $Nm^3/h$) is blown into the combustion chamber through the air supply 28. The amount of fuel and the amount of combustion air are adjusted such that a hot-gas temperature of about 1,130° C. and the desired reactor temperature of about 750° C. are reached at the outlet of the combustion chamber 26.

The end cooling of the anhydrite takes place in the last two chambers of the fluidized bed cooler 19. Cooling water is supplied through the conduit 30 to the banks of cooling tubes installed in two chambers as cooling coil 31 and returned through the conduit 45. The required fluidizing air is supplied to the fluidized bed cooler 19 through the conduit 20.

List of Designations 1 reactor
2 annular fluidized bed
3 central tube
4 discharge conduit
5 separator
6 solids return conduit
7 solids conduit
8 separator
9 solids conduit
10 heat exchanger
11 solids conduit
12 separator
13 solids conduit
14 product supply conduit
15 product supply conduit
16 rising conduit
17 cooling cyclone
18 solids conduit
19 cooling stage, fluidized bed cooler
20 air conduit
21 mixing chamber
22 supply conduit
23 air conduit
24 cooling coil
25 supply conduit
26 combustion chamber
27 supply conduit
28 air supply
29 gas-stream conduit
30 conduit
31 cooling coil
32 pre-heating stage
33 pre-heating stage
34 cooling system
35 cooling stage
36 gas distributor
37 supply conduit
38 screw conveyor
39 storage bunker 40 heat exchanger
41 supply conduit
42 fuel conduit
43 bag filter
44 exhaust gas blower
45 conduit

The invention claimed is:

1. A method for the heat treatment of fine-grained solids wherein the solids are heated to a temperature of 150 to 1000° C. in a fluidized bed reactor, comprising introducing a first gas or gas mixture from below through a gas supply tube into a mixing chamber of the reactor located above an annular stationary fluidized bed, the stationary annular fluidized bed being fluidized by supplying fluidizing gas, wherein the gas flowing through the gas supply tube entrains solids from the fluidized bed into the mixing chamber when passing through the upper orifice region of the gas supply tube, wherein the bed height of the solids in the reactor is adjusted such that the annular fluidized bed extends beyond the upper orifice end of the gas supply tube, and adjusting the gas velocities of the first gas or gas mixture as well as of the fluidizing gas for the annular fluidized bed such that the particle Froude numbers in the gas supply tube are between 1 and 100, in the annular fluidized bed between 0.02 and 2 and in the mixing chamber between 0.3 and 30.

2. The method as claimed in claim 1, wherein the particle Froude number in the gas supply tube is between 1.15 and 20.

3. The method as claimed in claim 1 wherein the particle Froude number in the annular fluidized bed is between 0.115 and 1.15.

4. The method as claimed in claim 1, wherein the particle Froude number in the mixing chamber is between 0.37 and 3.7.

5. The method as claimed in claim 1, wherein fine-grained solids with a grain size of less than 2 mm are supplied as starting material.

6. The method as claimed in claim 1, wherein hot gas, which is generated in an upstream combustion chamber by burning supplied fuel with an admixture of a gas containing oxygen, is supplied to the reactor via the gas supply tube.

7. The method as claimed in claim 1, wherein air is supplied to the reactor as fluidizing gas.

8. The method as claimed in claim 1, wherein the pressure in the reactor is between 0.8 and 10 bar.

9. The method as claimed in claim 1, wherein, before the heat treatment in the reactor, the solids are suspended, dried and pre-heated in at least one preheating stage comprising a heat exchanger and a downstream separator.

10. The method as claimed in claim 1, wherein, after the heat treatment in the reactor, the solids from the annular fluidized bed of the reactor are at least partly supplied to a cooling system which comprises an arrangement of a number of cooling stages connected one after the other.

11. The method as claimed in claim 10, wherein the solids form in a cooling stage at least one fluidized bed, in which it is cooled by a fluidizing gas or a cooling coil, formed in the fluidized bed, with cooling medium.

12. The method of claim 1, wherein the gas supply tube is central with regard to the stationary fluidized bed.

* * * * *